(12) United States Patent
Takasu et al.

(10) Patent No.: US 7,189,177 B2
(45) Date of Patent: Mar. 13, 2007

(54) ELECTRICALLY OPERATED VEHICLE DRIVE CONTROLLER, ELECTRICALLY OPERATED VEHICLE DRIVE CONTROL METHOD, AND ELECTRICALLY OPERATED VEHICLE WITH A VEHICLE DRIVE CONTROLLER

(75) Inventors: Eiji Takasu, Anjo (JP); Kenji Douzono, Anjo (JP); Toshio Okoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 196 days.

(21) Appl. No.: 10/947,371

(22) Filed: Sep. 23, 2004

(65) Prior Publication Data

US 2005/0070397 A1   Mar. 31, 2005

(30) Foreign Application Priority Data

Sep. 30, 2003   (JP) .............................. 2003-341084

(51) Int. Cl.
*F16H 3/72*   (2006.01)
(52) U.S. Cl. ......................................... 475/5; 180/65.2
(58) Field of Classification Search .................... 477/3, 477/115; 180/65.2, 65.3, 65.4; 903/941, 903/942; 475/5; 701/1, 79, 54
See application file for complete search history.

(56) References Cited

U.S. PATENT DOCUMENTS 5,823,281 A * 10/1998 Yamaguchi et al. ....... 180/65.2

| | | | |
|---|---|---|---|
| 5,907,191 A * | 5/1999 | Sasaki et al. | 290/19 |
| 6,557,656 B2 * | 5/2003 | Haniu et al. | 180/65.6 |
| 6,625,524 B2 * | 9/2003 | Yamaguchi et al. | 701/22 |
| 6,819,985 B2 * | 11/2004 | Minagawa et al. | 701/22 |
| 6,886,648 B1 | 5/2005 | Hata et al. | |
| 7,110,867 B2 * | 9/2006 | Imazu | 701/22 |
| 2001/0049570 A1 * | 12/2001 | Yamaguchi et al. | 701/22 |
| 2002/0079147 A1 * | 6/2002 | Yamaguchi et al. | 180/65.2 |
| 2002/0112901 A1 * | 8/2002 | Yamaguchi et al. | 180/65.2 |

FOREIGN PATENT DOCUMENTS

JP   A 2002-039008   2/2002

* cited by examiner

*Primary Examiner*—Charles A. Marmor
*Assistant Examiner*—Justin K. Holmes
(74) *Attorney, Agent, or Firm*—Oliff & Berridge, PLC

(57) ABSTRACT

An electrically operated vehicle drive controller used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, a rotating body rotatably arranged on a support shaft in one of the first to third differential rotating elements and meshed with the other two differential rotating elements, and an engine control processor that controls the operation of the engine on the basis of the rotating speed of the rotating body. Because the operation of the engine is controlled on the basis of the rotating speed of the rotating body, it is possible to prevent the rotating speed of the rotating body from becoming higher than an upper limit value.

21 Claims, 13 Drawing Sheets

ELECTRICALLY OPERATED VEHICLE DRIVE CONTROLLER, ELECTRICALLY OPERATED VEHICLE DRIVE CONTROL METHOD, AND ELECTRICALLY OPERATED VEHICLE WITH A VEHICLE DRIVE CONTROLLER

This application claims priority from JP 2003-341084, filed Sep. 30, 2003, the disclosure of which is incorporated herein in its entirety by reference thereto.

BACKGROUND OF THE INVENTION

1. Field of Invention

The invention relates to an electrically operated vehicle drive controller and an electrically operated vehicle drive control method.

2. Description of Related Art

A vehicle drive unit is conventionally mounted to a hybrid vehicle, as an electrically operated vehicle, and is structured so as to transmit one portion of torque of an engine, i.e., engine torque to an electric generator (electric generator motor) and also transmit the remaining engine torque to a drive wheel. The vehicle drive unit has a planetary gear unit, as a differential rotating unit, having a sun gear, a ring gear and a carrier. The carrier and the engine are connected to each other. The ring gear and a drive motor and the drive wheel are connected to each other. The sun gear and the electric generator are connected to each other. Rotations outputted from the ring gear and the drive motor are transmitted to the drive wheel so that a driving force is generated.

In the vehicle drive unit, an inverter is arranged between the drive motor and a drive motor controller. The inverter is operated in accordance with a driving signal sent from the drive motor controller, and generates the electric currents of U, V, W phases by receiving a direct electric current from a battery, and supplies the electric current of each phase to the drive motor. Therefore, the inverter has a plurality of transistors, such as six transistors, as switching elements. A pair of transistors makes up a unit that forms a transistor module (IGBT) for each phase (U, V, W). Accordingly, when the driving signal is sent to each transistor in a predetermined pattern, the transistor is turned on and off and the electric current of each phase is generated.

The rotating speed of the drive motor, i.e., the drive motor rotating speed is detected by a drive motor rotating speed sensor. For example, the torque of the drive motor, i.e., the drive motor torque, etc. in the drive motor are controlled on the basis of the drive motor rotating speed.

Further, the rotating speed of the electric generator, i.e., the electric generator rotating speed is detected by an electric generator rotating speed sensor. The rotating speed of the engine as a target, i.e., an engine target rotating speed is limited by upper and lower limit values in accordance with the present vehicle speed such that no electric generator rotating speed becomes a predetermined value or more, e.g., see JP-A-2002-39008.

SUMMARY OF THE INVENTION

However, in the above conventional vehicle drive unit, a pinion engaged with the sun gear and the ring gear is arranged in the carrier connected to the engine. Accordingly, the electric generator rotating speed can be set so as not to become a predetermined value or more, but there is a case in which the rotating speed of the pinion, i.e., the pinion rotating speed exceeds an upper limit value in accordance with vehicle states such as the vehicle speed, the engine rotating speed, etc. In this case, durability of the planetary gear unit is reduced.

An object of the invention is to provide an electrically operated vehicle drive controller and an electrically operated vehicle drive control method able to improve the durability of the differential rotating unit by solving the problems of the above conventional vehicle drive unit.

Therefore, the electrically operated vehicle drive controller of an exemplary embodiment of the invention comprises an electrically operated machine, an output shaft differentially rotatably connected to an engine and the electrically operated machine, a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, and engine control processing means for controlling the operation of the engine on the basis of the rotating speed of the rotating body.

Another exemplary embodiment comprises an electrically operated machine, an output shaft differentially rotatably connected to an engine and the electrically operated machine, a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, a rotating speed detecting section for detecting the rotating speeds of at least two rotating elements of the rotating elements of the electrically operated machine, the engine and the output shaft, and rotating body rotating speed calculation processing means for calculating the rotating speed of the rotating body on the basis of the rotating speeds detected by the rotating speed detecting section and a rotating speed relationship in the differential rotating unit.

Further, an electrically operated vehicle drive control method is applied to an electrically operated vehicle drive unit comprising an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements. The operation of the engine is controlled on the basis of the rotating speed of the rotating body.

Lastly, an exemplary embodiment includes an electrically operated vehicle comprising an engine, an electrically operated machine, an output shaft rotatably connected to the engine and the electrically operated machine, a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements and an engine control processing element that controls the operating of the engine on the basis of the rotating speed of the rotating body.

Because the operation of the engine is controlled on the basis of the rotating speed of the rotating body, it is possible to prevent the rotating speed of the rotating body becoming higher than the upper limit value. Accordingly, durability of the differential rotating unit can be improved.

BRIEF DESCRIPTION OF THE DRAWINGS

The invention will be described with reference to the drawings, in which.

DETAILED DESCRIPTION OF PREFERRED EMBODIMENTS

The exemplary embodiments will next be explained in detail with reference to the drawings. In this case, a hybrid type vehicle will be used as an electrically operated vehicle.

Figure 1:
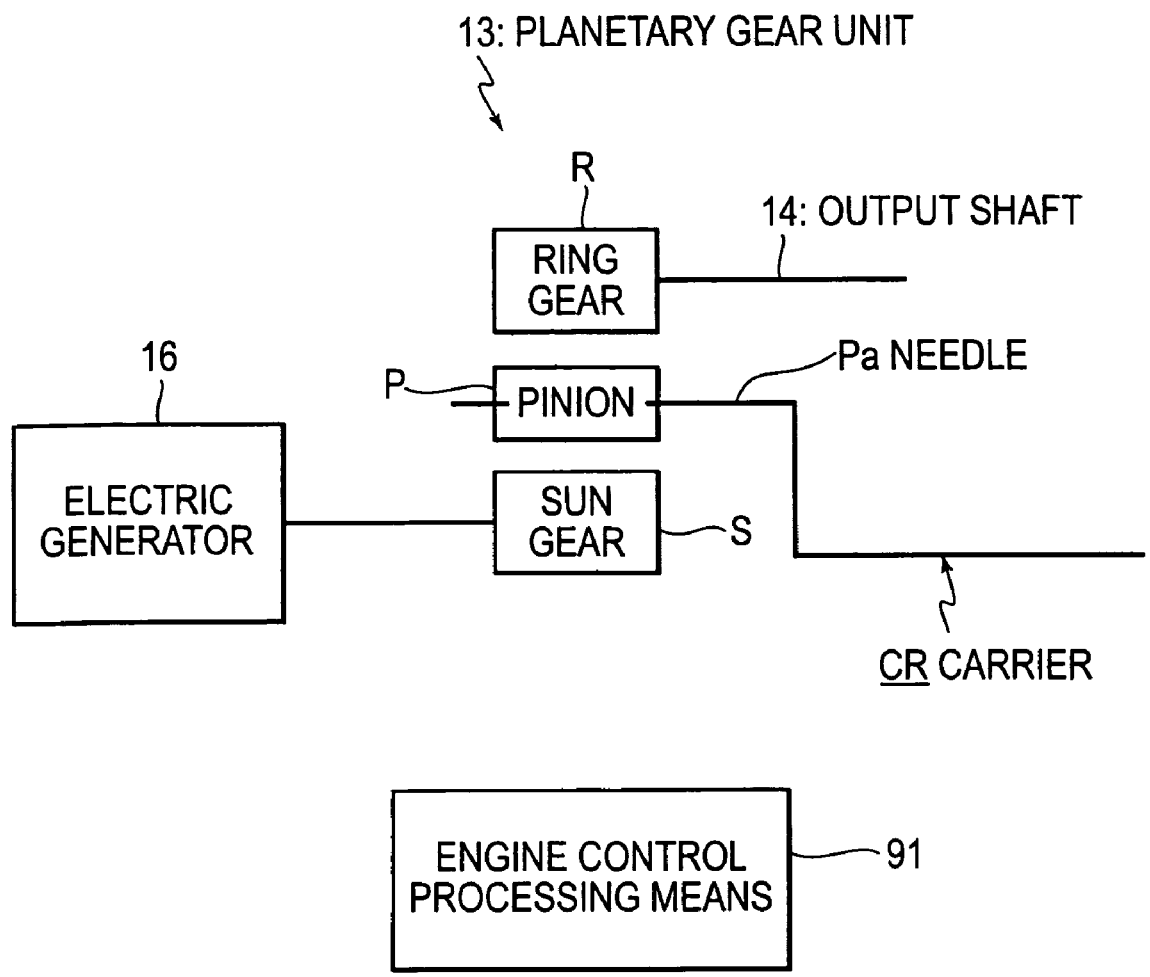
FIG. 1 is a functional block diagram of an electrically operated vehicle drive controller in a first exemplary embodiment.

In FIG. 1, reference numerals 16, 14, 13 respectively designate an electric generator as an electrically operated machine, an output shaft and a planetary gear unit as a differential rotating unit. The output shaft 14 is differentially rotatably connected to an engine (not shown) and the electric generator 16. The planetary gear unit 13 has a sun gear S as a first differential rotating element connected to the electric generator 16, a ring gear R as a second differential rotating element connected to the output shaft 14, and a carrier CR as a third differential rotating element connected to the engine. In one differential rotating element of the sun gear S, the ring gear R and the carrier CR, a pinion P, as a rotating body rotatably arranged with respect to a pin Pa as a support shaft, and the other two differential rotating elements are rotated and engaged with each other. Reference numeral 91 designates an engine control processing means for controlling the operation of the engine on the basis of the rotating speed of the pinion P.

Figure 2:
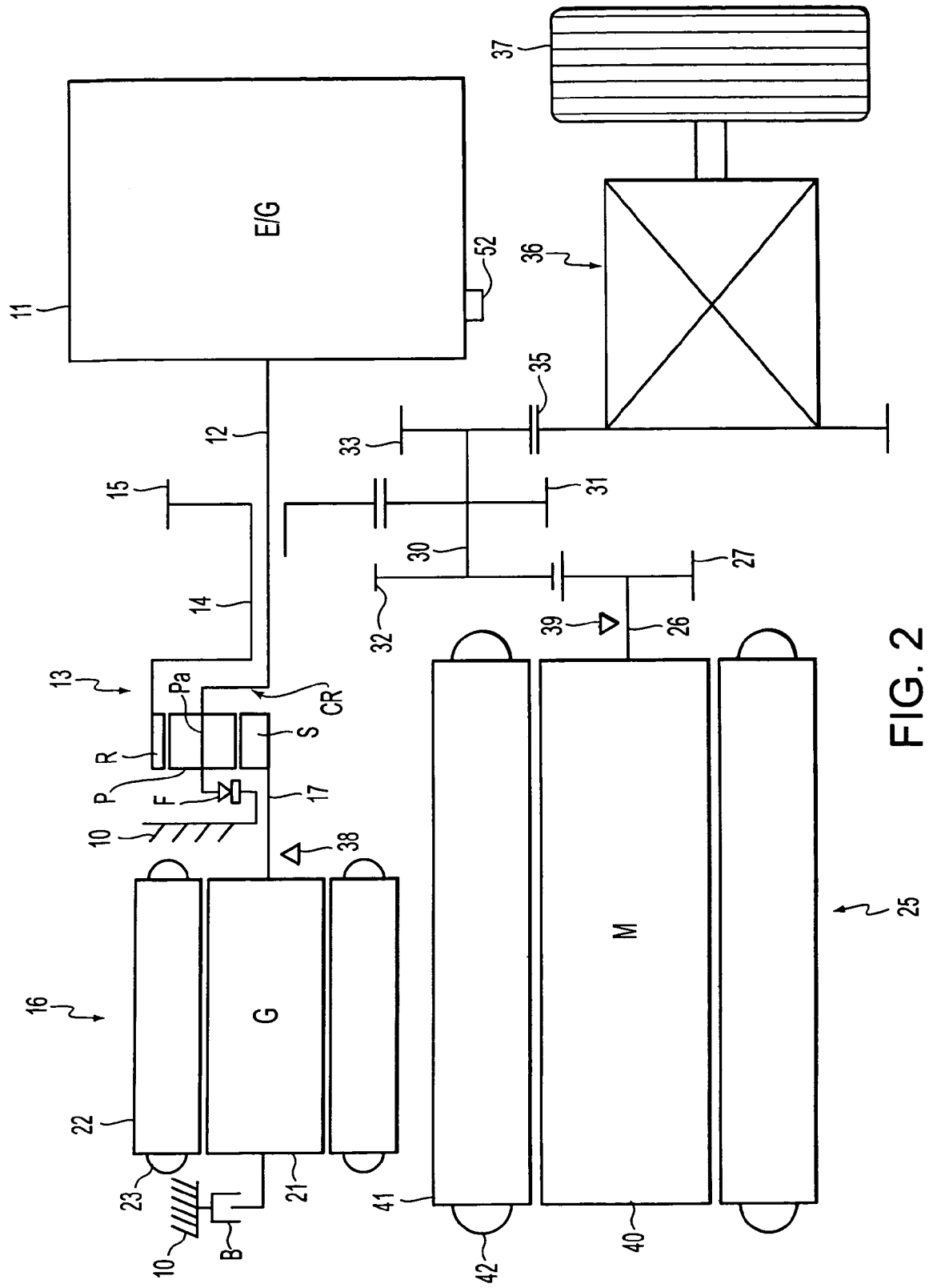
FIG. 2 is a conceptual view of a hybrid type vehicle in the first exemplary embodiment.
Figure 3:
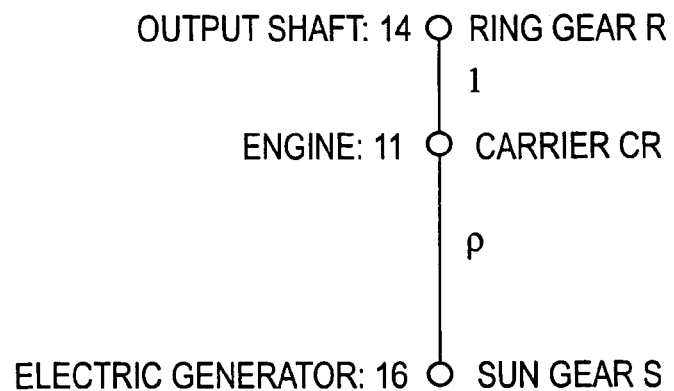
FIG. 3 is a view for explaining the operation of a planetary gear unit in the first exemplary embodiment.

In FIG. 2, a conceptual view of the hybrid type vehicle, reference numerals 11, 12, 13 respectively designate the engine (E/G) arranged on a first axis, an output shaft and the planetary gear unit, as a differential rotating unit. The output shaft 12 is arranged on the first axis and outputs a rotation generated by driving the engine 11. The planetary gear unit 13 is arranged on the first axis and makes a speed change with respect to the rotation inputted through the output shaft 12. Reference numerals 14, 15, 16 respectively designate an output shaft, a first counter drive gear as an output gear fixed to the output shaft 14, and an electric generator (G) as a first electrically operated machine. The output shaft 14 is arranged on the first axis. The rotation after the speed change in the planetary gear unit 13 is outputted to the output shaft 14. The electric generator 16 is arranged on the first axis and is connected to the planetary gear unit 13 through a transmission shaft 17. Further, the electric generator 16 is differentially, rotatably and mechanically connected to the engine 11. Further still, the electric generator 16 is mechanically connected to a drive wheel 37 as a vehicle wheel.

The output shaft 14 has a sleeve shape and is arranged so as to surround or be coaxial to, the output shaft 12. Further, the first counter drive gear 15 is arranged on the above engine 11 side from the planetary gear unit 13.

The planetary gear unit 13 is structured by a simple planetary gear having at least the sun gear S as a first differential rotating element, the pinion P as a rotating body engaged with the sun gear S, the ring gear R as a second differential rotating element engaged with the pinion P, and the carrier CR as a third differential rotating element for rotatably supporting the pinion P. The sun gear S is connected to the electric generator 16 through the transmission shaft 17. The ring gear R is arranged on a second axis parallel with the first axis through the output shaft 14 and a predetermined gear series. The ring gear R is connected to the drive wheel 37 and a drive motor (M) 25 as a second electrically operated machine differentially, rotatably and mechanically connected to the engine 11 and the electric generator 16. The carrier CR is connected to the engine 11 through the output shaft 12. Namely, the carrier CR is arranged by rotation-engaging the pinion P, the sun gear S and the ring gear R.

The pinion P is rotatably supported with respect to the pin Pa as a support shaft attached to the carrier CR. Accordingly, the pinion P is moved around the sun gear S together with the carrier CR, and is also rotated on its own axis with respect to the pin Pa.

The drive motor 25 is mechanically connected to the drive wheel 37. Further, a one-way clutch F is arranged between the carrier CR and a case 10 of the hybrid type vehicle drive unit. The one-way clutch F becomes free when the rotation of the positive direction is transmitted from the engine 11 to the carrier CR. The one-way clutch F is locked when the rotation of the reverse direction is transmitted from the electric generator 16 or the drive motor 25 to the carrier CR.

Thus, the one-way clutch F stops the rotation of the engine 11 so as to not transmit the rotation in the reverse direction to the engine 11. Accordingly, when the electric generator 16 is operated in a state in which the driving of the engine 11 is stopped, a reaction force is applied to the torque transmitted from the electric generator 16 by the one-way clutch F. A brake (not shown) as a stopping means can be also arranged between the carrier CR and the case 10 instead of the one-way clutch F.

The electric generator 16 has a rotor 21 rotatably fixed to the transmission shaft 17, a stator 22 arranged around the rotor 21, and a coil 23 wound around the stator 22. The electric generator 16 generates electric power by the rotation transmitted through the transmission shaft 17. The coil 23 is connected to a battery 43 (FIG. 6) and supplies a direct electric current to the battery. An electric generator brake B is arranged between the rotor 21 and the case 10, and the rotor 21 is fixed by engaging the electric generator brake B so that the rotation of the electric generator 16 can be mechanically stopped.

Reference numerals 26, 27 respectively designate an output shaft and a second counter drive gear as an output gear fixed to the output shaft 26. The output shaft 26 is arranged on a second axis and the rotation of the drive motor 25 is outputted to the output shaft 26. The drive motor 25 has a rotor 40 rotatably fixed to the output shaft 26, a stator 41 arranged around the rotor 40, and a coil 42 wound around the stator 41.

The drive motor 25 generates drive motor torque TM by the electric currents of U, V, W phases as alternating electric currents supplied to the coil 42. Therefore, the coil 42 is connected to the battery 43, and the direct electric current from the battery 43 is converted into the electric currents of the respective phases and is supplied to the coil 42.

A counter shaft 30 is arranged on a third axis parallel with the first and second axes to rotate the drive wheel 37 in the same direction as the rotation of the engine 11. A first counter driven gear 31 and a second counter driven gear 32 having a tooth number larger than that of the first counter driven gear 31 are fixed to the counter shaft 30. The first counter driven gear 31 and the first counter drive gear 15 are engaged with each other. Further, the second counter driven gear 32 and the second counter drive gear 27 are engaged with each other. The rotation of the first counter drive gear 15 is inverted and transmitted to the first counter driven gear 31. The rotation of the second counter drive gear 27 is inverted and transmitted to the second counter driven gear 32. A diff-pinion gear 33 having a tooth number smaller than that of the first counter driven gear 31 is fixed to the counter shaft 30.

A differential device 36 is arranged on a fourth axis parallel with the first to third axes. A diff-ring gear 35 of the differential device 36 and the diff-pinion gear 33 are engaged with each other. Accordingly, rotation transmitted to the diff-ring gear 35 is distributed by the differential device 36 and is transmitted to the drive wheels 37 (only one is shown). Thus, the rotation generated by the engine 11 can be transmitted to the first counter driven gear 31, and the rotation generated by the drive motor 25 can be also transmitted to the second counter driven gear 32. Accordingly, the hybrid type vehicle can run by driving the engine 11 and the drive motor 25.

Figure 6:
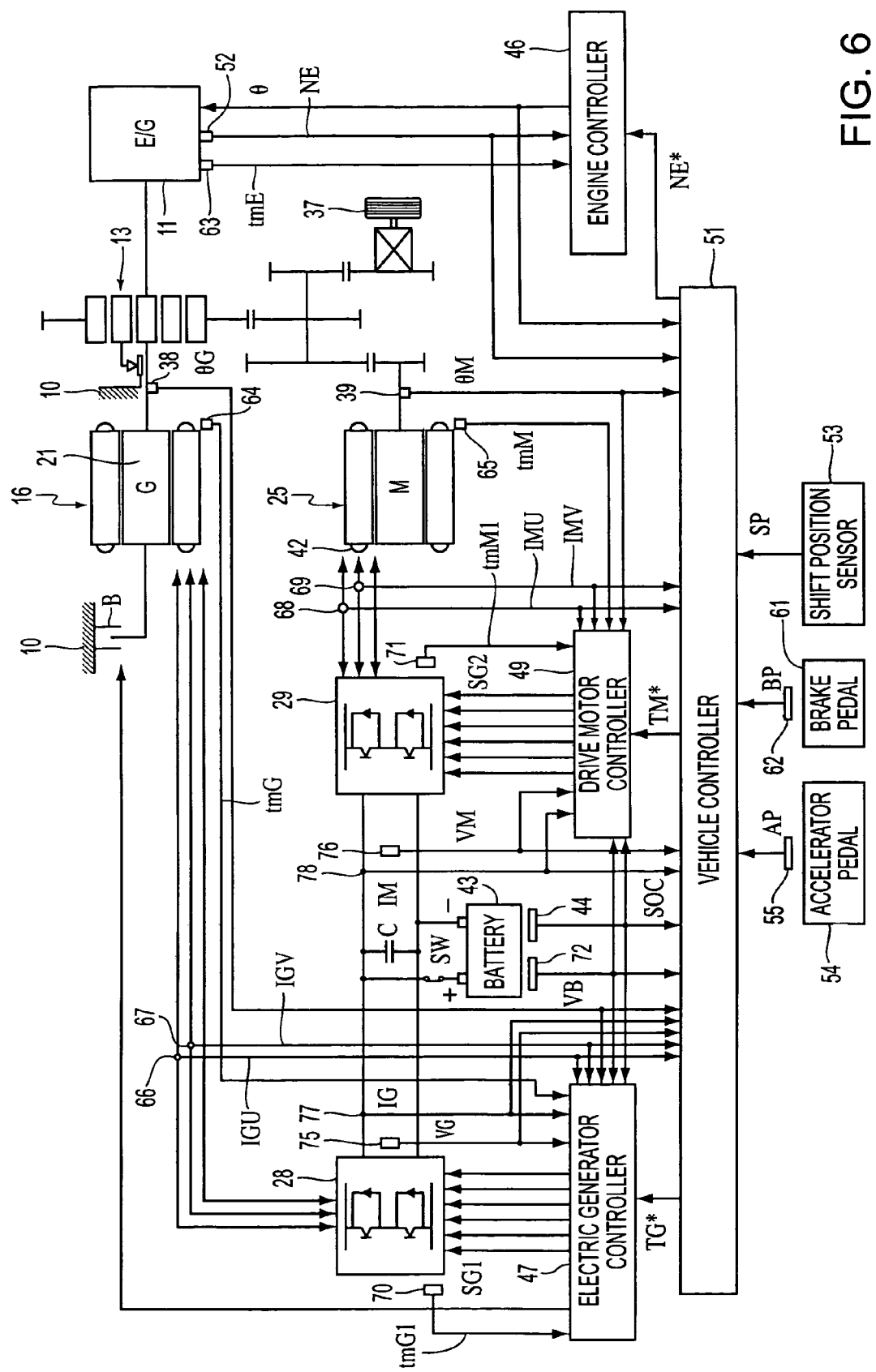
FIG. 6 is a conceptual view of a hybrid type vehicle drive controller in the first exemplary embodiment.
Figure 7:
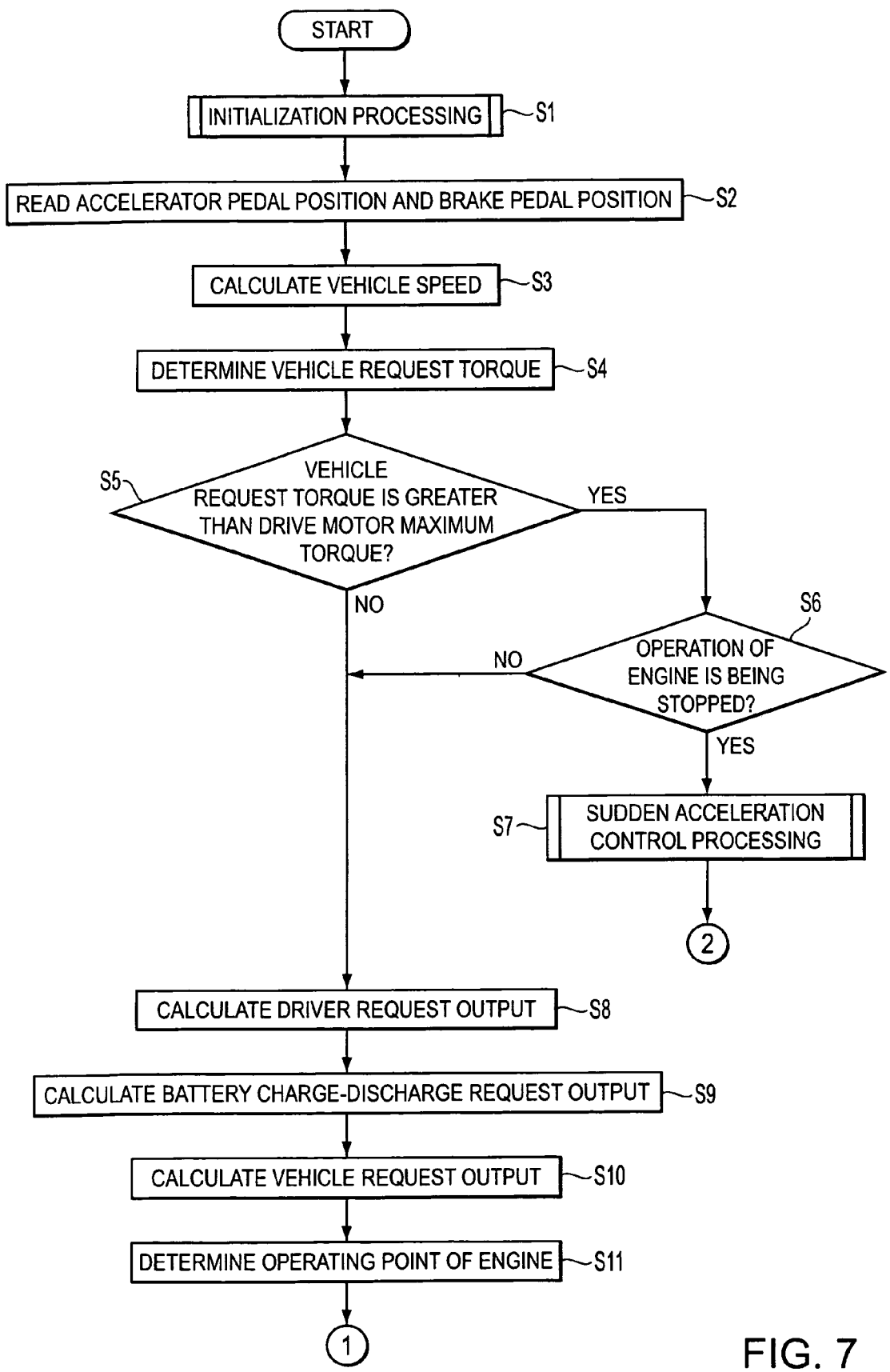
FIG. 7 is a first main flow chart showing the operation of the hybrid type vehicle drive controller in the first exemplary embodiment.
Figure 8:
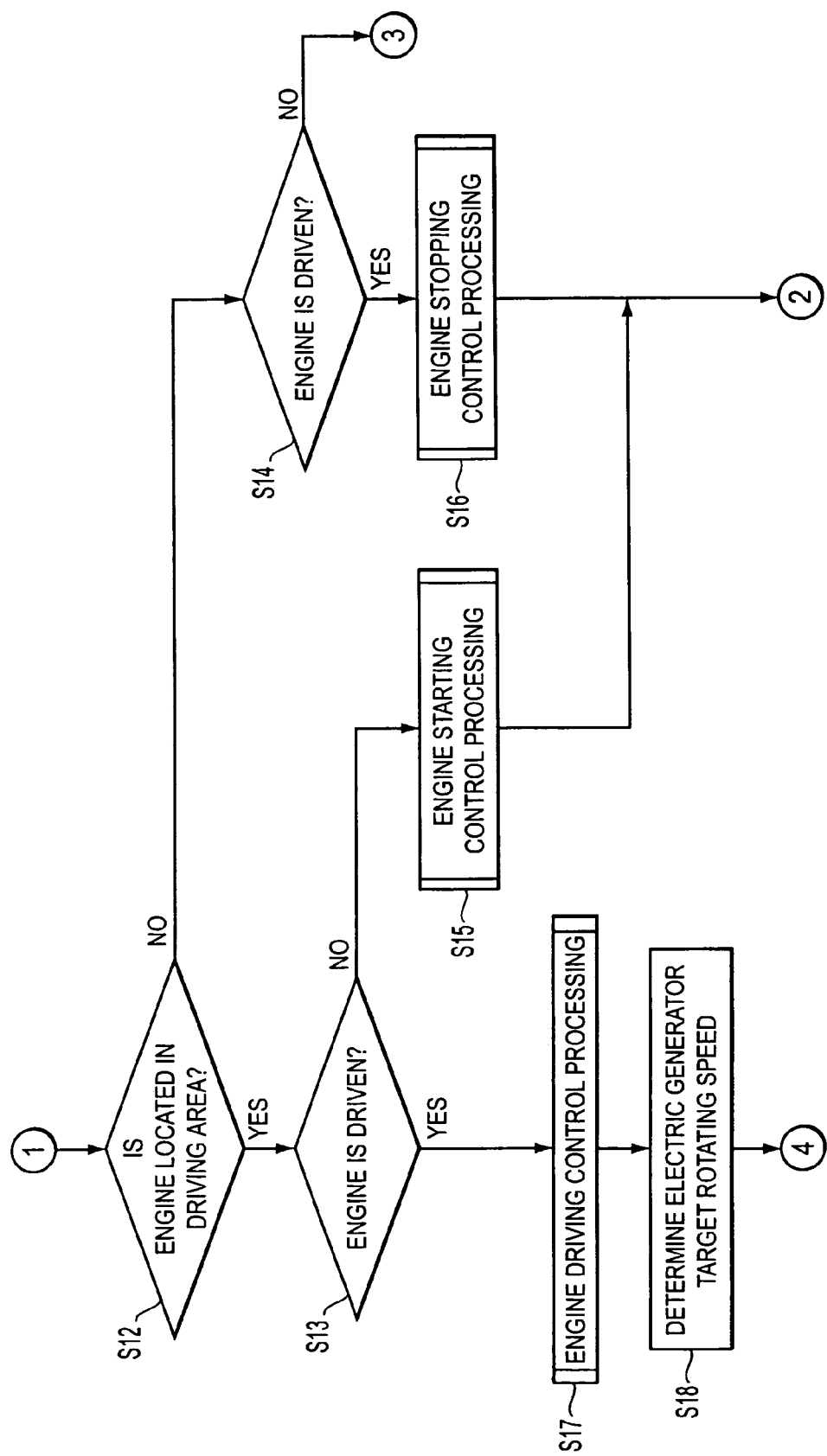
FIG. 8 is a second main flow chart showing the operation of the hybrid type vehicle drive controller in the first exemplary embodiment.

Reference numeral 38 designates an electric generator rotor position sensor, such as a resolver, etc., for detecting the position of the rotor 21, i.e., an electric generator rotor position θG. Reference numeral 39 designates a drive motor rotor position sensor, such as a resolver, etc., for detecting the position of the rotor 40, i.e., a drive motor rotor position θM. The detected electric generator rotor position θG is sent to a vehicle controller 51 (FIG. 6) and an electric generator controller 47 (FIG. 6). The drive motor rotor position θM is sent to the vehicle controller 51 and a drive motor controller 49 (FIG. 6). Reference numeral 52 designates an engine rotating speed sensor, as a first rotating speed calculating section and an engine rotating speed detecting section for detecting the rotating speed of the engine 11, i.e., an engine rotating speed NE. The engine rotating speed NE is sent to the vehicle controller 51 and an engine controller 46 (FIG. 6).

The operation of the planetary gear unit 13 will next be explained. In the planetary gear unit 13 (FIG. 2), the carrier CR is connected to the engine 11, the sun gear S is connected to the electric generator 16, and the ring gear R is connected to the drive motor 25 and the drive wheel 37 through the output shaft 14 and a predetermined gear series. Accordingly, the rotating speed of the ring gear R, i.e., a ring gear rotating speed NR, and the rotating speed outputted to the output shaft 14, i.e., an output shaft rotating speed, are equal to each other. Additionally, the rotating speed of the carrier CR and the engine rotating speed NE are equal to each other. Further, the rotating speed of the sun gear S and an electric generator rotating speed NG, as a first electrically operated machine rotating speed, are equal to each other. When the tooth number of the ring gear R is set to ρ times (twice in this exemplary embodiment) the tooth number of the sun gear S, the relationship of:

$$(\rho+1) \cdot NE = 1 \cdot NG + \cdot NR,$$

is formed. Accordingly, the engine rotating speed NE:

$$NE = (1 \cdot NG + \rho \cdot NR)/(\rho+1), \qquad (1)$$

can be calculated on the basis of the ring gear rotating speed NR and the electric generator rotating speed NG. The rotating speed relation formula showing the relationship of the respective rotating speeds of the sun gear S, the ring gear R and the carrier CR in the planetary gear unit 13 is provided by formula (1). In this case, when at least two of the electric generator rotating speed NG, the engine rotating speed NE and the ring gear rotating speed R are known on the basis of the rotating speed relation formula, the other one rotating speed can be calculated.

Further, engine torque TE, the torque generated in the ring gear R, i.e., ring gear torque TR, and the torque of the electric generator 16, i.e., electric generator torque TG as a first electrically operated machine torque, have the relationship of:

$$TE:TR:TG = (\rho+1):\rho:1, \qquad (2)$$

so that these torques mutually receive reaction forces. The torque relation formula of the planetary gear unit 13 is provided by the relationship (2).

Figure 4:
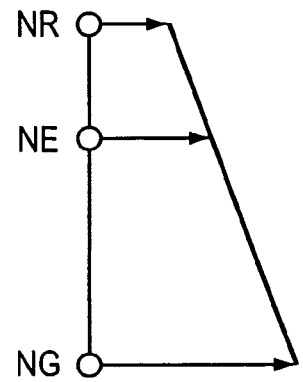
FIG. 4 is a vehicle speed diagram at a normal running time in the first exemplary embodiment.
Figure 5:
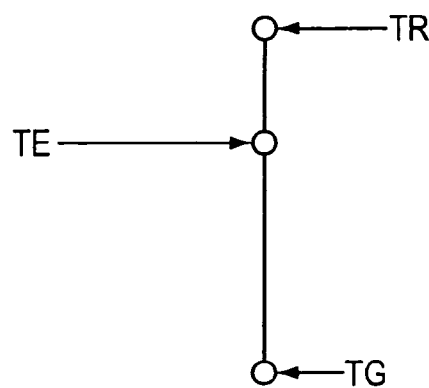
FIG. 5 is a torque diagram at the normal running time in the first exemplary embodiment.

At the normal running time of the hybrid type vehicle, each of the ring gear R, the carrier CR and the sun gear S is rotated in the positive direction. As shown in FIG. 4, each of the ring gear rotating speed NR, the engine rotating speed NE and the electric generator rotating speed NG has a positive value. Further, the ring gear torque TR and the electric generator torque TG are obtained by proportionally dividing the engine torque TE in a torque ratio determined by the tooth number of the planetary gear unit 13. Accordingly, the torque provided by adding the ring gear torque TR and the electric generator torque TG becomes equal to the engine torque TE in the torque diagram shown in FIG. 5.

The hybrid type vehicle drive controller, as an electrically operated vehicle drive controller for controlling the operation of the hybrid type vehicle drive unit, will next be explained. In FIG. 6, reference numerals 10, 11, 13 respectively designate the case, the engine (E/G) and the planetary gear unit. Reference numerals 16, B, 25 respectively designate the electric generator (G), the electric generator brake B for fixing the rotor 21 of the electric generator 16, and the drive motor (M). Reference numerals 28, 29, 37 respectively designate an electric generator inverter for operating the electric generator 16, a drive motor inverter for driving the drive motor 25, and the drive wheel. Reference numerals 38, 39, 43 respectively designate the electric generator rotor position sensor, the drive motor rotor position sensor and the battery. The inverters 28, 29 are connected to the battery 43 through a power switch SW. The battery 43 supplies the direct electric current to the inverters 28, 29 when the power switch SW is turned on. Each of the inverters 28, 29 has a plurality of transistors, such as six transistors, as switching elements. A pair of transistors makes up a unit that forms a transistor module (IGBT) for each phase (U, V, W).

An electric generator inverter voltage sensor 75, as a first direct current voltage detecting section, is arranged on the inlet side of the inverter 28 to detect the direct current voltage applied to the inverter 28, i.e., an electric generator inverter voltage VG. An electric generator inverter electric current sensor 77, as a first direct electric current detecting section, is arranged on the inlet side of the inverter 28 to detect the direct electric current supplied to the inverter 28, i.e., an electric generator inverter electric current IG. Further, a drive motor inverter voltage sensor 76, as a second direct current voltage detecting section, is arranged on the inlet side of the inverter 29 to detect the direct current voltage applied to the inverter 29, i.e., a drive motor inverter voltage VM. A drive motor inverter electric current sensor 78, as a second direct electric current detecting section, is arranged on the inlet side of the inverter 29 to detect the direct electric current supplied to the inverter 29, i.e., a drive motor inverter electric current IM. The electric generator inverter voltage VG and the electric generator inverter electric current IG are sent to the vehicle controller 51 and the electric generator controller 47. The drive motor inverter voltage VM and the drive motor inverter electric current IM are sent to the vehicle controller 51 and the drive motor controller 49. A capacitor C, for smoothing, is connected between the battery 43 and the inverters 28, 29.

Further, the vehicle controller 51 is provided by a CPU, a recorder, etc. (not shown), to control the operation of the entire hybrid type vehicle drive unit, and functions as a computer in accordance with predetermined programs, data, etc. The engine controller 46, the electric generator controller 47 and the drive motor controller 49 are connected to the vehicle controller 51. The engine controller 46 is provided by a CPU, a recorder, etc. (not shown), and sends an instruction signal of a throttle aperture θ, valve timing, etc. to the engine 11 and the vehicle controller 51 to control the operation of the engine 11. Further, the electric generator controller 47 is provided by a CPU, a recorder, etc. (not shown), and sends a driving signal SG1 to the inverter 28 so as to control the operation of the electric generator 16. The drive motor controller 49 is provided by a CPU, a recorder, etc. (not shown), and sends a driving signal SG2 to the inverter 29 so as to control the operation of the drive motor 25. A first controller located in a hierarchal position lower than that of the vehicle controller 51 is provided by the engine controller 46, the electric generator controller 47 and the drive motor controller 49. A second controller located in a hierarchal position above the positions of the engine controller 46, the electric generator controller 47 and the drive motor controller 49 is provided by the vehicle controller 51. The engine controller 46, the electric generator controller 47 and the drive motor controller 49 also function as computers in accordance with predetermined programs, data, etc.

The inverter 28 is operated in accordance with the driving signal SG1, and generates electric currents IGU, IGV, IGW of the respective phases by receiving the direct electric current from the battery 43 at a power applying time. The inverter 28 also supplies the electric currents IGU, IGV, IGW of the respective phases to the electric generator 16, and generates the direct electric current by receiving the electric currents IGU, IGV, IGW of the respective phases from the electric generator 16 at a regenerative time, and supplies this direct electric current to the battery 43.

The inverter 29 is operated in accordance with the driving signal SG2, and generates electric currents IMU, IMV, IMW of the respective phases by receiving the direct electric current from the battery 43 at the power applying time. The inverter 29 also supplies the electric currents IMU, IMV, IMW of the respective phases to the drive motor 25, and generates the direct electric current by receiving the electric currents IMU, IMV, IMW of the respective phases from the drive motor 25 at the regenerative time, and supplies this direct electric current to the battery 43.

Reference numerals 44, 52, 53 respectively designate a battery remaining amount detector for detecting a state of the battery 43, i.e., the battery remaining amount SOC as a battery state, the engine rotating speed sensor for detecting the engine rotating speed NE, and a shift position sensor for detecting the position of a shift lever. (not shown) as a selecting speed operating means, i.e., a shift position SP. Reference numerals 54, 55, 61 respectively designate an accelerator pedal, an accelerator switch as an accelerator operation detecting section for detecting the position (stepping-in amount) of the accelerator pedal 54, i.e., an accelerator pedal position AP, and a brake pedal. Reference numerals 62, 63, 64 respectively designate a brake switch as a brake operation detecting section for detecting the position (stepping-on amount) of the brake pedal 61, i.e., a brake pedal position BP, an engine temperature sensor for detecting the temperature tmE of the engine 11, and an electric generator temperature sensor for detecting the temperature of the electric generator 16, e.g., the temperature tmG of the coil 23 (FIG. 2). Reference numerals 65, 70, 71 respectively designate a drive motor temperature sensor for detecting the temperature of the drive motor 25, e.g., the temperature tmM of the coil 42, a first inverter temperature sensor for detecting the temperature tmGI of the inverter 28, and a second inverter temperature sensor for detecting the temperature tmMI of the inverter 29.

A first electrically operated machine driving section is provided by the electric generator 16, the inverter 28, etc. A second electrically operated machine driving section is provided by the drive motor 25, the inverter 29, etc. The temperatures tmG, tmGI, etc. are detected as the temperature of the first electrically operated machine driving section, i.e., a first driving section temperature. The temperatures tmM, tmMI, etc. are detected as the temperature of the second electrically operated machine driving section, i.e., a second driving section temperature. The temperatures tmG, tmGI, etc. are sent to the electric generator controller 47, and the temperatures tmM, tmMI, etc. are sent to the drive motor controller 49. Further, the temperature tmO of oil for cooling the electric generator 16 and the drive motor 25 can be also be detected as a driving section temperature common to the first and second electrically operated machine driving sections by an oil temperature sensor (not shown). In this example, a first driving section temperature detecting section is provided by the electric generator temperature sensor 64, the first inverter temperature sensor 70, the oil temperature sensor, etc. A second driving section temperature detecting section is provided by the drive motor temperature sensor 65, the second inverter temperature sensor 71, the oil temperature sensor, etc.

Further, each of reference numerals 66 to 69 designates an electric current sensor as an alternating electric current detecting section for detecting electric currents IGU, IGV, IMU, IMV of the respective phases. Reference numeral 72 designates a battery voltage sensor as a voltage detecting section for the battery 43 for detecting a battery voltage VB as the battery state. The battery voltage VB and the battery remaining amount SOC are sent to the electric generator controller 47, the drive motor controller 49 and the vehicle controller 51. Further, the battery electric current, the battery temperature, etc. can be also detected as a battery state. A battery state detecting section is provided by the battery remaining amount detector 44, the battery voltage sensor 72, a battery electric current sensor (not shown), a battery temperature sensor (not shown), etc. The electric currents IGU, IGV are supplied to the electric generator controller 47 and the vehicle controller 51. The electric currents IMU, IMV are supplied to the drive motor controller 49 and the vehicle controller 51.

The vehicle controller 51 sends an engine control signal to the engine controller 46, and sets starting and stopping of the engine 11 by the engine controller 46. A vehicle speed calculation processing means (not individually shown) of the vehicle controller 51 performs vehicle speed calculation processing, calculates a changing ratio AOM of the drive motor rotor position θM, and also calculates the vehicle speed V on the basis of the changing ratio ΔθM and a gear ratio γV in a torque transmission system from the output shaft 26 to the drive wheel 37.

The vehicle controller 51 sets an engine target rotating speed NE* as a target value for the engine rotating speed NE, electric generator target torque TG*, as the first electrically operated machine target torque, as a target value for the electric generator torque TG, and drive motor target torque TM*, as the second electrically operated machine target torque, as a target value for the drive motor torque TM. The electric generator controller 47 sets an electric generator target rotating speed NG*, as a first electrically operated machine target rotating speed, as a target value for the electric generator rotating speed NG. The drive motor controller 49 sets a drive motor torque correction value ATM as a correction value for the drive motor torque TM. A control command value is provided by the engine target rotating speed NE*, the electric generator target torque TG*, the drive motor target torque TM*, etc.

An electric generator rotating speed calculation processing means (not individually shown) of the electric generator controller 47 performs electric generator rotating speed calculation processing, reads the electric generator rotor position θG and calculates the electric generator rotating speed NG by calculating a changing ratio ΔθG of the electric generator rotor position θG.

A drive motor rotating speed calculation processing means (not individually shown) of the drive motor controller 49 performs drive motor rotating speed calculation processing, reads the drive motor rotor position θM and calculates a drive motor rotating speed NM as a second electrically operated machine rotating speed by calculating a changing ratio ΔθM of the drive motor rotor position θM.

The electric generator rotor position θG and the electric generator rotating speed NG are proportional to each other. The drive motor rotor position θM, the drive motor rotating speed NM and the vehicle speed V are proportional to each other. Accordingly, the electric generator rotor position sensor 38 and the electric generator rotating speed calculation processing means can be also set to function as an electric generator rotating speed detecting section as a second rotating speed calculating section for detecting the electric generator rotating speed NG. Further, the drive motor rotor position sensor 39 and the drive motor rotating speed calculation processing means can be also set to function as a drive motor rotating speed detecting section as a third rotating speed calculating section for detecting the drive motor rotating speed NM. Further, the drive motor rotor position sensor 39 and the vehicle speed calculation processing means can be also set to function as a vehicle speed detecting section for detecting the vehicle speed V.

In this exemplary embodiment, the engine rotating speed NE is detected by the engine rotating speed sensor 52, but can be calculated in the engine controller 46. Further, in this exemplary embodiment, the vehicle speed V is calculated by the vehicle speed calculation processing means on the basis of the drive motor rotor position θM. However, the vehicle speed V can be also calculated on the basis of the ring gear rotating speed NR by detecting the ring gear rotating speed NR. Further, the vehicle speed V can be also calculated on the basis of the rotating speed of the drive wheel 37, i.e., the drive wheel rotating speed. In this case, a ring gear rotating speed sensor, a drive wheel rotating speed sensor, etc. are provided as the vehicle speed detecting section.

Figure 10:
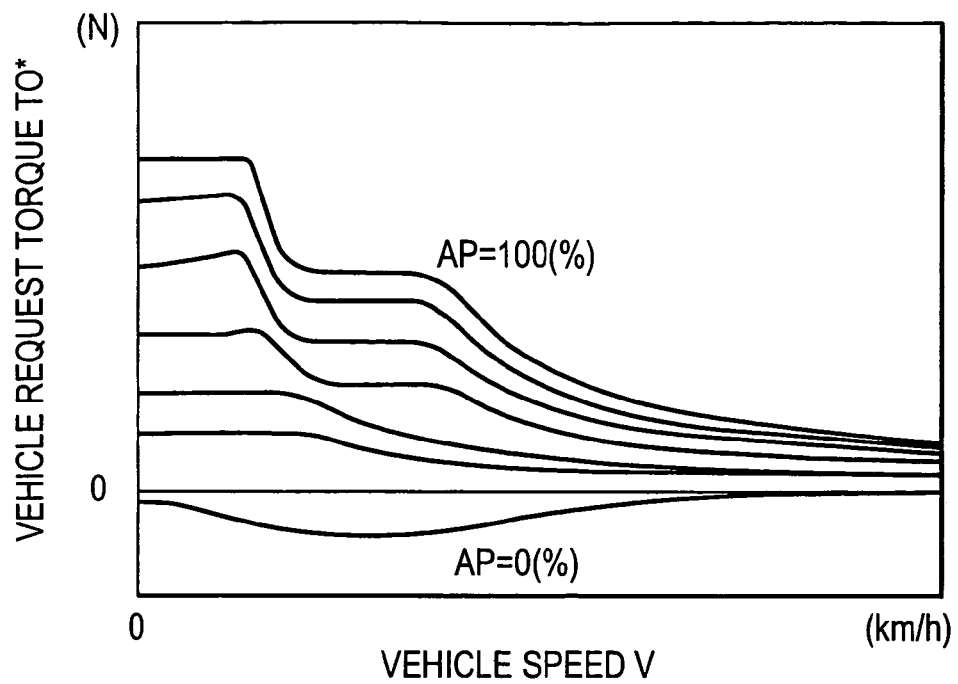
FIG. 10 is a view showing a first vehicle request torque map in the first exemplary embodiment.
Figure 11:
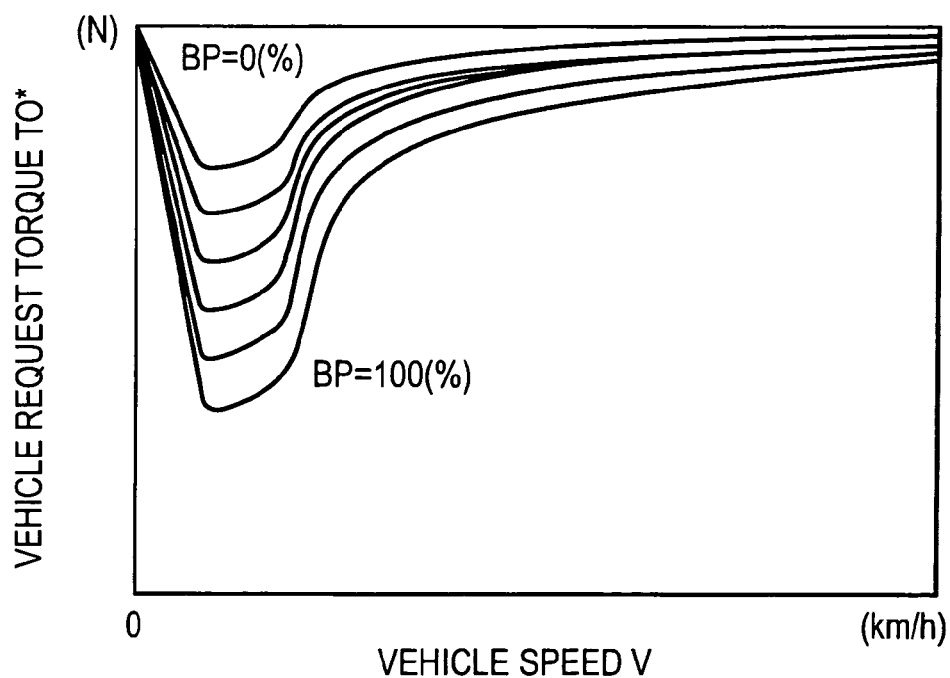
FIG. 11 is a view showing a second vehicle request torque map in the first exemplary embodiment.
Figure 12:
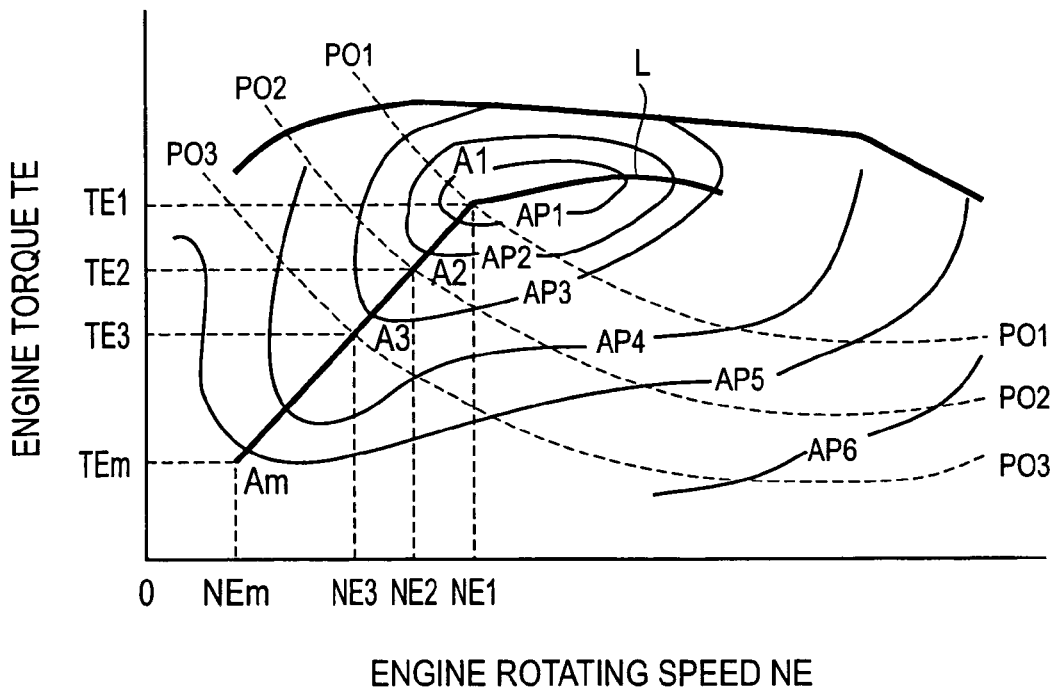
FIG. 12 is a view showing an engine target operating state map in the first exemplary embodiment.
Figure 13:
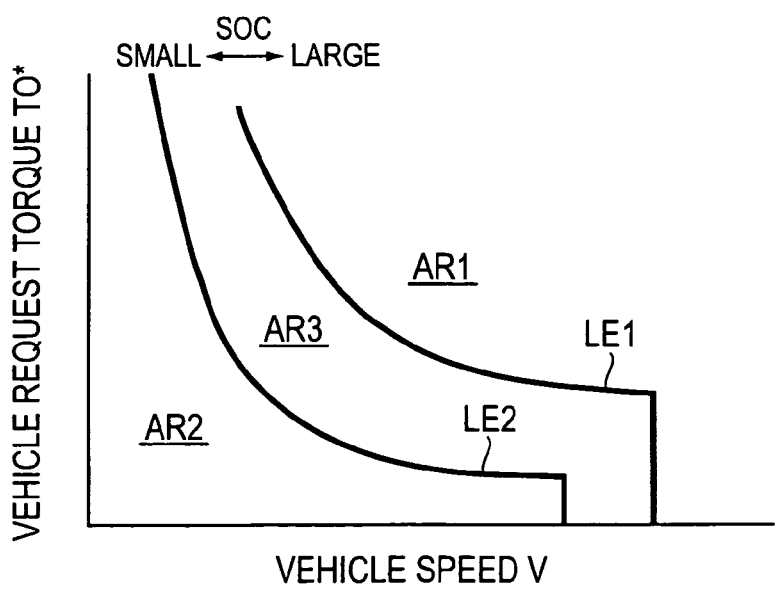
FIG. 13 is a view showing an engine driving area map in the first exemplary embodiment.

The operation of the hybrid type vehicle drive controller of the above structure will next be explained using FIGS. 7–14. In FIGS. 10, 11 and 13, the axis of the abscissa shows the vehicle speed V and the axis of the ordinate shows vehicle request torque TO*. In FIG. 12, the axis of the abscissa shows the engine rotating speed NE and the axis of the ordinate shows the engine torque TE.

First, an initialization processing means (not individually shown) of the vehicle controller 51 (FIG. 6) sets various variables to initial values by performing initialization processing (step S1). Next, the vehicle controller 51 reads the accelerator pedal position AP from the accelerator switch 55 and also reads the brake pedal position BP from the brake switch 62 (step S2). Further, the vehicle speed calculation processing means reads the drive motor rotor position θM and calculates the changing ratio ΔθM of the drive motor rotor position θM and calculates the vehicle speed V on the basis of this changing ratio ΔθM and the gear ratio γV (step S3).

Subsequently, a vehicle request torque determination processing means (not individually shown) of the vehicle controller 51 performs vehicle request torque determination processing (step S4). When the accelerator pedal 54 is stepped on, the vehicle request torque determination processing means determines the vehicle request torque TO* required to run the hybrid type vehicle and set in advance to correspond to the accelerator pedal position AP, the brake pedal position BP and the vehicle speed V with reference to the first vehicle request torque map of FIG. 10 which is recorded in the recorder (memory or storage unit) of the vehicle controller 51. When the brake pedal 61 is stepped on, the vehicle request torque determination processing means determines the vehicle request torque TO* with reference to the second vehicle request torque map of FIG. 11 recorded in the recorder.

Next, the vehicle controller 51 judges whether the vehicle request torque TO* is greater than the drive motor maximum torque TMmax as second electrically operated machine maximum torque showing a maximum value of the drive motor torque TM (step S5). When the vehicle request torque TO* is greater than the drive motor maximum torque TMmax (step S5, Yes), the vehicle controller 51 judges whether the operation of the engine 11 is being stopped (step S6). When the operation of the engine 11 is being stopped (step S6, Yes), a sudden acceleration control processing means (not individually shown) of the vehicle controller 51 performs sudden acceleration control processing and runs the hybrid type vehicle by driving the drive motor 25 and the electric generator 16 (step S7).

In contrast to this, when the vehicle request torque TO* is the drive motor maximum torque TMmax or less (step S5, No), when the vehicle request torque TO* is greater than the drive motor maximum torque TMmax and there is no operation of the engine 11 being stopped (step S5, Yes; step S6, No), a driver request output calculation processing means (not individually shown) of the vehicle controller 51 performs driver request output calculation processing and calculates a driver request output PD:

$$PD=TO^* \cdot V,$$

by multiplying the vehicle request torque TO* and the vehicle speed V (step S8). When the vehicle request torque TO* and the drive motor maximum torque TMmax are compared with each other in step S5, the drive motor maximum torque TMmax is actually multiplied by the gear ratio γMA from the output shaft 26 to the drive shaft of the drive wheel 37, and the vehicle request torque TO* and the multiplied value are compared with each other. The first and second vehicle request torque maps can be also made by estimating the gear ratio γMA in advance.

Next, a battery charge-discharge request output calculation processing means (not individually shown) of the vehicle controller 51 performs battery charge-discharge request output calculation processing and reads the battery remaining amount SOC from the battery remaining amount detector 44 and calculates a battery charge-discharge request output PB on the basis of the battery remaining amount SOC (step S9).

Subsequently, a vehicle request output calculation processing means (not individually shown) of the vehicle controller 51 performs vehicle request output calculation processing and calculates a vehicle request output PO:

$$PO=PD+PB,$$

by adding the driver request output PD and the battery charge-discharge request output PB (step S10).

Next, an engine target operating state setting processing means (not individually shown) of the vehicle controller 51 performs engine target operating state setting processing. With reference to the engine target operating state map of FIG. 12, recorded in the recorder of the vehicle controller 51, the engine target operating state setting processing means determines points A1 to A3, Am at which lines PO1, PO2,—showing the vehicle request output PO and an optimum fuel cost curve L providing highest efficiency of the engine 11 in each of accelerator pedal positions AP1 to AP6 cross each other. The engine target operating state setting processing means determines these points A1 to A3, Am as operating points of the engine 11 in an engine target operating state (step S11). The engine target operating state setting processing means also determines engine torques TE1 to TE3, TEm at these operating points as engine target torque TE* showing a target value of the engine torque TE. The engine target operating state setting processing means also determines engine rotating speeds NE1 to NE3, NEm at the operating points as the engine target rotating speed NE*, and sends this engine target rotating speed NE* to the engine controller 46.

The engine controller 46 then judges whether the engine 11 is located in a driving area AR1 with reference to the engine driving area map of the FIG. 13, recorded in the recorder of the engine controller 46 (step S12). In FIG. 13, reference numerals AR1, AR2 and AR3 respectively designate the driving area for driving the engine 11, a stopping area for stopping the driving of the engine 11, and a hysteresis area. Further, reference numerals LE1 and LE2 respectively designate a line for starting the engine 11 that is currently stopped in operation, and a line for stopping the driving of the driven, or operating, engine 11. As the battery remaining amount SOC is increased, the line LE1 is moved rightward in FIG. 13 and the driving area AR1 is narrowed. In contrast to this, when the battery remaining amount SOC is reduced, the line LE1 is moved leftward in FIG. 13 and the driving area AR1 is widened.

When the engine 11 is located in the driving area AR1 (step S12, Yes) but is not driven (step S13, No), an engine starting control processing means (not individually shown) of the engine controller 46 performs engine starting control processing and starts the engine 11 (step S15). When the engine 11 is not located in the driving area AR1 (step S12, No) but the engine 11 is driven (step S14, Yes), an engine stopping control processing means (not individually shown) of the engine controller 46 performs engine stopping control processing and stops the driving of the engine 11 (step S116). When the engine 11 is not located in the driving area AR1 (step S12, No) and is not driven (step S14, No), a drive motor target torque calculation processing means (not individually shown) of the vehicle controller 51 performs drive motor target torque calculation processing and calculates and determines the vehicle request torque TO* as drive motor target torque TM* and sends this drive motor target torque TM* to the drive motor controller 49 (step S26). A drive motor control processing means (not individually shown) of the drive motor controller 49 performs torque control of the drive motor 25 by performing drive motor control processing (step S27).

Further, when the engine 11 is located in the driving area AR1 (step S12, Yes) and is driven (step S113, Yes), an engine driving control processing means (not individually shown) of the engine controller 46 performs engine driving control processing and controls the operation of the engine 11 by a predetermined method (step S117).

Next, an electric generator target rotating speed calculation processing means (not individually shown) of the electric generator controller 47 performs electric generator target rotating speed calculation processing (step S18). Specifically, the electric generator target rotating speed calculation processing means reads the drive motor rotor position θM from the vehicle controller 51 and calculates the ring gear rotating speed NR on the basis of the drive motor rotor position θM and a gear ratio γR from the output shaft 26 (FIG. 2) to the ring gear R. The electric generator target rotating speed calculation processing means also reads the engine target rotating speed NE* determined in the engine target operating state setting processing and calculates the electric generator target rotating speed NG* by the rotating speed relation formula on the basis of the ring gear rotating speed NR and the engine target rotating speed NE*.

When the hybrid type vehicle described above is run by the drive motor 25 and the engine 11 and the electric generator rotating speed NG is low, electric power consumption is increased and electric generation efficiency of the electric generator 16 is reduced and fuel cost of the hybrid type vehicle correspondingly becomes worse. Therefore, when the absolute value of the electric generator target rotating speed NG* is smaller than a predetermined rotating speed (step S19, No), the electric generator brake B is engaged (step S21, Yes or step S21, No; step S22) and the operation of the electric generator 16 is mechanically stopped so as to improve the fuel cost.

Therefore, the electric generator controller 47 judges whether the absolute value of the electric generator target rotating speed NG* is a predetermined first rotating speed Nth1 (e.g., 500 rpm) or more (step S19, Yes). When the absolute value of the electric generator target rotating speed NG* is the first rotating speed Nth1 or more, the electric generator controller 47 judges whether the electric generator brake B is released (step S20). When the electric generator brake B is released (step S20, Yes), an electric generator rotating speed control processing means (not individually shown) of the electric generator controller 47 performs electric generator rotating speed control processing and also performs the torque control of the electric generator 16 (step S23). In contrast to this, when the electric generator brake B is not released (step S20, No), an electric generator brake release control processing means (not individually shown) of the electric generator controller 47 performs electric generator brake release control processing and releases the electric generator brake B (step S24).

When the electric generator target torque TG* is set and the torque control of the electric generator 16 is performed on the basis of this electric generator target torque TG* in the electric generator rotating speed control processing (step S23) and a predetermined electric generator torque TG is generated, reaction forces are mutually applied to the engine torque TE, the ring gear torque TR and the electric generator torque TG as mentioned above. Accordingly, the electric generator torque TG is converted into the ring gear torque TR and is outputted from the ring gear R.

When the electric generator rotating speed NG is changed and the ring gear torque TR is changed as the ring gear torque TR is outputted from the ring gear R, the changed ring gear torque TR is transmitted to the drive wheel 37 and a running feeling of the hybrid type vehicle is reduced. Therefore, the ring gear torque TR is calculated by estimating the torque of inertia (inertias of the rotor 21 and the rotor shaft) of the electric generator 16 caused by changing the electric generator rotating speed NG.

Therefore, a ring gear torque calculation processing means (not individually shown) of the vehicle controller 51 performs ring gear torque calculation processing, and reads the electric generator target torque TG* and calculates the ring gear torque TR on the basis of the electric generator target torque TG* and a ratio of the tooth number of the ring gear R to the tooth number of the sun gear S.

Namely, when the inertia of the electric generator 16 is set to InG and the angular acceleration of the electric generator 16 (the changing ratio of an angular velocity ω corresponding to the electric generator rotor position θG, i.e., a rotation changing ratio) is set to αG, torque applied to the sun gear S, i.e., the sun gear torque TS is obtained by subtracting a torque equivalent component (inertia torque) TGI:

$$TGI = InG \cdot \alpha G,$$

of the inertia InG from the electric generator target torque TG*:

$$TS = TG^* - TGI$$

$$= TG^* - InG \cdot \alpha G. \quad (3)$$

When the engine rotating speed NE is constant, the torque equivalent component TGI normally has a negative value with respect to an accelerating direction during the acceleration of the hybrid type vehicle, and has a positive value with respect to the accelerating direction during the deceleration of the hybrid type vehicle. The angular acceleration αG is calculated by differentiating the electric generator rotating speed NG.

When the tooth number of the ring gear R is ρ times the tooth number of the sun gear S, the ring gear torque TR is ρ times the sun gear torque TS so that the ring gear torque TR is provided as follows:

$$TR = \rho \cdot TS \quad (4)$$

$$= \rho \cdot (TG^* - TGI)$$

$$= \rho \cdot (TG^* - InG \cdot \alpha G).$$

Thus, the ring gear torque TR can be calculated from the electric generator target torque TG* and the torque equivalent component TGI.

Therefore, a drive shaft torque estimation processing means (not individually shown) of the vehicle controller 51 performs drive shaft torque estimation processing and estimates torque in the output shaft 26, i.e., drive shaft torque TR/OUT on the basis of the above electric generator target torque TG* and the torque equivalent component TGI (step S25). Namely, the drive shaft torque estimation processing means estimates and calculates the drive shaft torque TR/OUT on the basis of the ring gear torque TR and a ratio of the tooth number of the second counter drive gear 27 to the tooth number of the ring gear R.

When the electric generator brake B is engaged, the electric generator target torque TG* is set to zero (0). Accordingly, the ring gear torque TR has a relationship proportional to the engine torque TE. Therefore, when the electric generator brake B is engaged, the drive shaft torque estimation processing means reads the engine torque TE through the vehicle controller 51, and calculates the ring gear torque TR by the torque relation formula on the basis of the engine torque TE, and estimates the drive shaft torque TR/OUT on the basis of the ring gear torque TR and the ratio of the tooth number of the second counter drive gear 27 to the tooth number of the ring gear R.

Subsequently, the drive motor target torque calculation processing means performs the drive motor target torque calculation processing (step S26) and calculates and determines an excessive or deficient amount in the drive shaft torque TR/OUT as the drive motor target torque TM* by subtracting the drive shaft torque TR/OUT from the vehicle request torque TO*.

The drive motor control processing means then performs the drive motor control processing and performs the torque control of the drive motor 25 on the basis of the determined drive motor target torque TM* and controls the drive motor torque TM (step S27).

Further, when the absolute value of the electric generator target rotating speed NG* is smaller than the first rotating speed Nth1 (step S19, No), the electric generator controller 47 judges whether the electric generator brake B is engaged (step S21) as discussed above. When the electric generator brake B is not engaged (step S21, No), an electric generator brake engaging control processing means (not individually shown) of the electric generator controller 47 performs electric generator brake engaging control processing and engages the electric generator brake B (step S22).

Because the pinion P is arranged in the carrier CR connected to the engine 11 as mentioned above, the durability of the planetary gear unit 13 is reduced when the pinion rotating speed NP exceeds an upper limit value NPmax (9000 rpm in this exemplary embodiment) in accordance with the vehicle states, such as the vehicle speed V, the engine rotating speed NE, etc.

Figure 14:
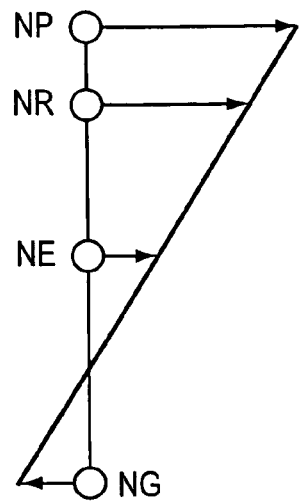
FIG. 14 is a vehicle speed diagram when an electric generator in the first exemplary embodiment has no load.

Namely, as shown in FIG. 14, when the electric generator rotating speed NG has a negative value and the electric generator 16 has no load and the engine 11 is driven, the ring gear rotating speed NR is raised as the absolute value of the electric generator rotating speed NG is increased. Therefore, the pinion rotating speed NP is further raised.

Therefore, the engine control processing means 91 (FIG. 1) of the vehicle controller 51 performs the engine control processing (step S28) and calculates the present pinion rotating speed NP (step S28-1) and judges whether the pinion rotating speed NP is higher than the upper limit value NPmax (step S28-2). When the pinion rotating speed NP is equal to or higher than the upper limit value NPmax (step S28-2, Yes), the engine control processing means 91 limits the engine rotating speed NE as a first engine rotating index (step S28-3). Therefore, the engine control processing means 91 limits the engine target rotating speed NE* as a second engine rotating index. When the pinion speed NP is less than the upper limit value NPmax (step S28-2, No), the engine rotating speed is not limited (step S28-4).

Figure 9:
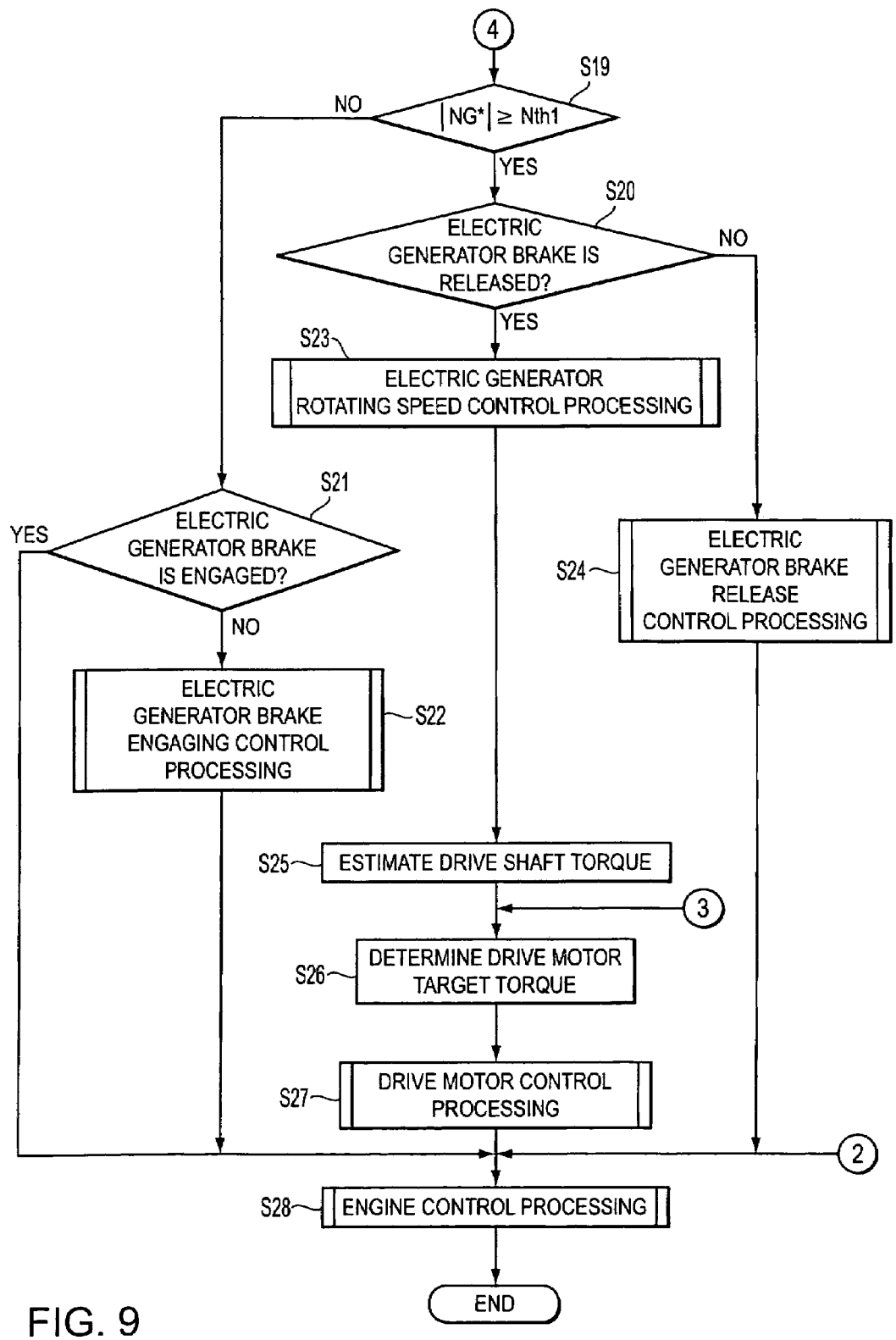
FIG. 9 is a third main flow chart showing the operation of the hybrid type vehicle drive controller in the first exemplary embodiment.
Figure 15:
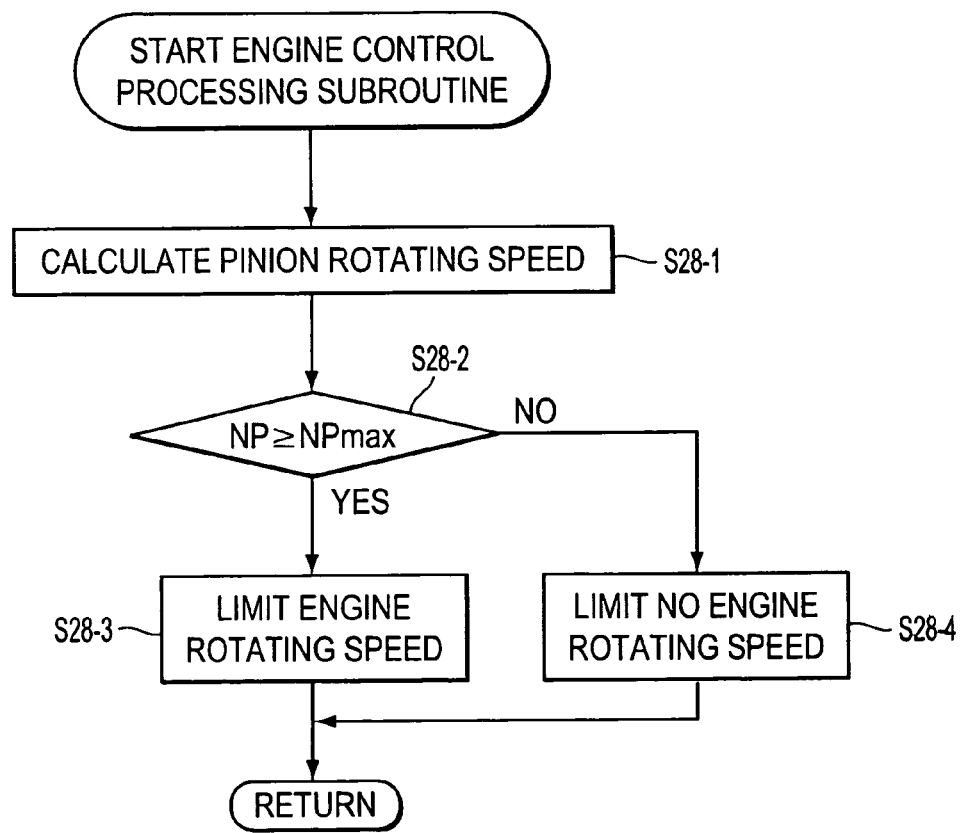
FIG. 15 is a view showing a subroutine of engine control processing in the first exemplary embodiment.
Figure 16:
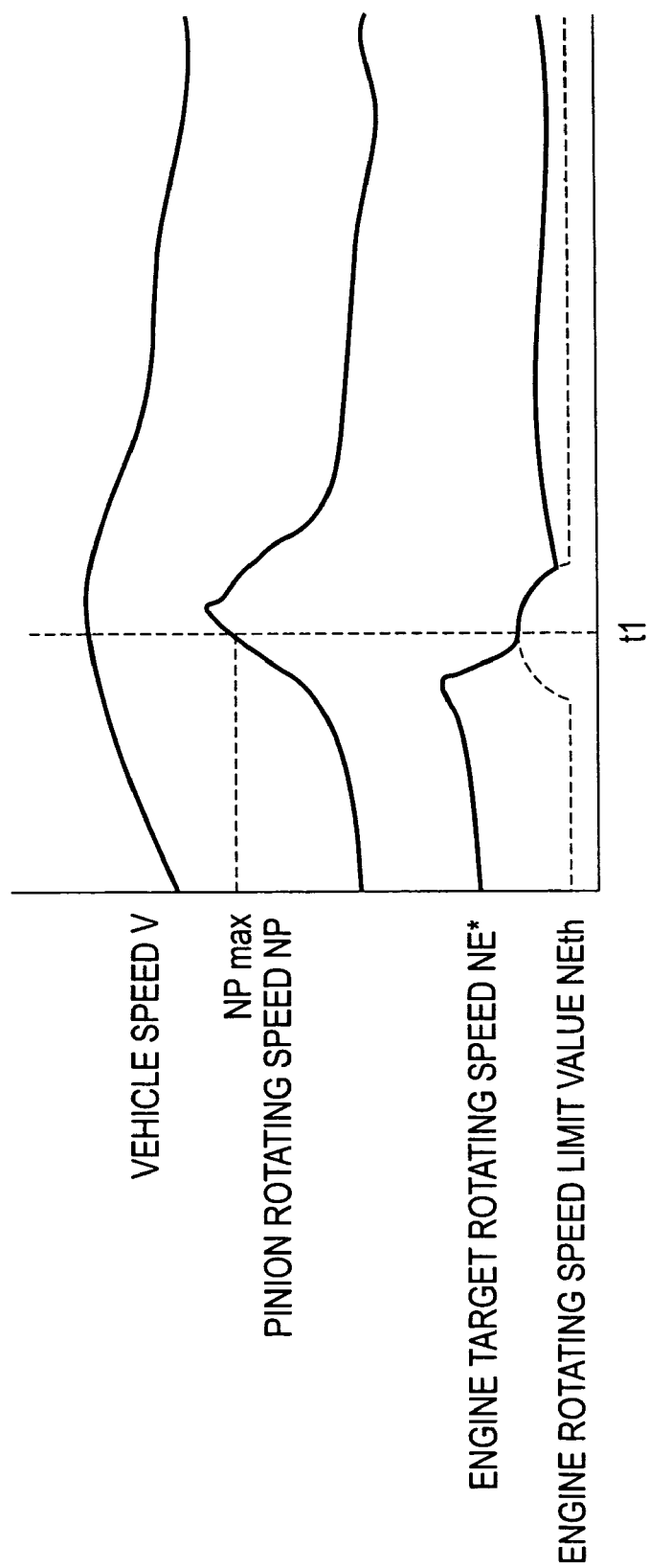
FIG. 16 is a time chart showing the operation of the engine control processing in the first exemplary embodiment.

Discussing the subroutine of the engine control processing found in step S28 of FIG. 9 in more detail, reference is made to FIGS. 15 and 16.

First, a pinion rotating speed calculation processing means (not individually shown), as a rotating body rotating speed calculation processing means of the engine control processing means 91 (FIG. 1), performs pinion rotating speed calculation processing as rotating body rotating speed calculation processing and reads the ring gear rotating speed NR. On the basis of a ratio γpr, $$\gamma pr = Zp/Zr,$$

of the tooth number Zp of the pinion P to the tooth number Zr of the ring gear R and the engine rotating speed NE, the pinion rotating speed calculation processing means then calculates the pinion rotating speed NP:

$$NP = (NR - NE)/\gamma pr.$$

Thus, the pinion rotating speed NP can be calculated on the basis of the rotating speed relation formula in the planetary gear unit 13 (step S28-1).

Subsequently, a pinion rotating speed judgment processing means (not individually shown) of the engine control processing means 91 performs ring gear rotating speed judgment processing and reads the pinion rotating speed NP and the upper limit value NPmax and judges whether the pinion rotating speed NP is the upper limit value NPmax or more (step S28-2).

When the pinion rotating speed NP is the upper limit value NPmax or more (step S28-2, Yes), a correction processing means (not individually shown) of the engine control processing means 91 performs correction processing and limits the engine rotating speed NE (step S28-3). Therefore, the correction processing means corrects and limits the engine target rotating speed NE*. Therefore, the correction processing means reads the vehicle speed V and also reads an engine rotating speed limit value NEth showing a lower limit value of the engine rotating speed NE corresponding to the vehicle speed V with reference to an engine rotating speed map (not shown) recorded in the recorder of the vehicle controller 51 (FIG. 6) in advance. The correction processing means further sets the engine rotating speed limit value NEth to the engine target rotating speed NE*.

In the engine rotating speed map, the engine rotating speed limit value NEth corresponding to each vehicle speed V is calculated in advance such that no pinion rotating speed NP becomes the upper limit value NPmax or more. The vehicle speed V and the engine rotating speed limit value NEth are recorded in the recorder in correspondence to each other.

In contrast to this, when the pinion rotating speed NP is lower than the upper limit value NPmax (step S28-2, No), the engine control processing means 91 does not limit the engine rotating speed NE. Further, the engine target rotating speed NE* is not corrected (step S28-4).

As shown in FIG. 16, when the pinion rotating speed NP is raised and becomes the upper limit value NPmax at timing t1, the engine rotating speed limit value NEth corresponding to the vehicle speed V is read and is set to the engine target rotating speed NE*.

When the pinion rotating speed NP becomes the upper limit value NPmax in this way, the engine rotating speed NE is limited. Accordingly, it is possible to prevent the pinion rotating speed NP from becoming higher than the upper limit value NPmax. Accordingly, the durability of the planetary gear unit 13 can be improved.

In this exemplary embodiment, the engine rotating speed limit value NEth, corresponding to the vehicle speed V, is read with reference to the engine rotating speed map recorded in the recorder of the vehicle controller 51 in advance, and the engine rotating speed limit value NEth is set to the engine target rotating speed NE*. However, an engine torque map can be also recorded in the recorder in advance.

In such a case, when the pinion rotating speed NP is the upper limit value NPmax or more, the correction processing means limits the engine rotating speed NE by correcting the engine target torque TE*. Therefore, the correction processing means reads the vehicle speed V and also reads an engine torque limit value TEth showing a lower limit value of the engine torque TE corresponding to the vehicle speed V with reference to the engine torque map. Subsequently, the correction processing means determines the engine torque TE at the operating point of the engine 11 corresponding to the engine torque limit value TEth as the engine target torque TE* with reference to the engine target operating state map of FIG. 12, and sets the engine rotating speed NE at this operating point to the engine target rotating speed NE*.

In the engine torque map, the engine torque limit value TEth corresponding to each vehicle speed V is calculated in advance such that no pinion rotating speed NP becomes the upper limit value NPmax or more. The vehicle speed V and the engine torque limit value TEth are recorded to the recorder in correspondence to each other.

In this case, when the pinion rotating speed NP becomes the upper limit value NPmax, the engine torque TE is limited and the engine rotating speed NE can be limited correspondingly to the engine torque TE. Accordingly, it is possible to prevent the pinion rotating speed NP from becoming higher than the upper limit value NPmax. As its result, the durability of the planetary gear unit 13 can be improved.

In this exemplary embodiment, it is necessary to calculate the pinion rotating speed NP on the basis of the ring gear rotating speed NR and the engine rotating speed NE to perform the correction processing. Accordingly, a control scale is increased and a processing speed is reduced.

Figure 17:
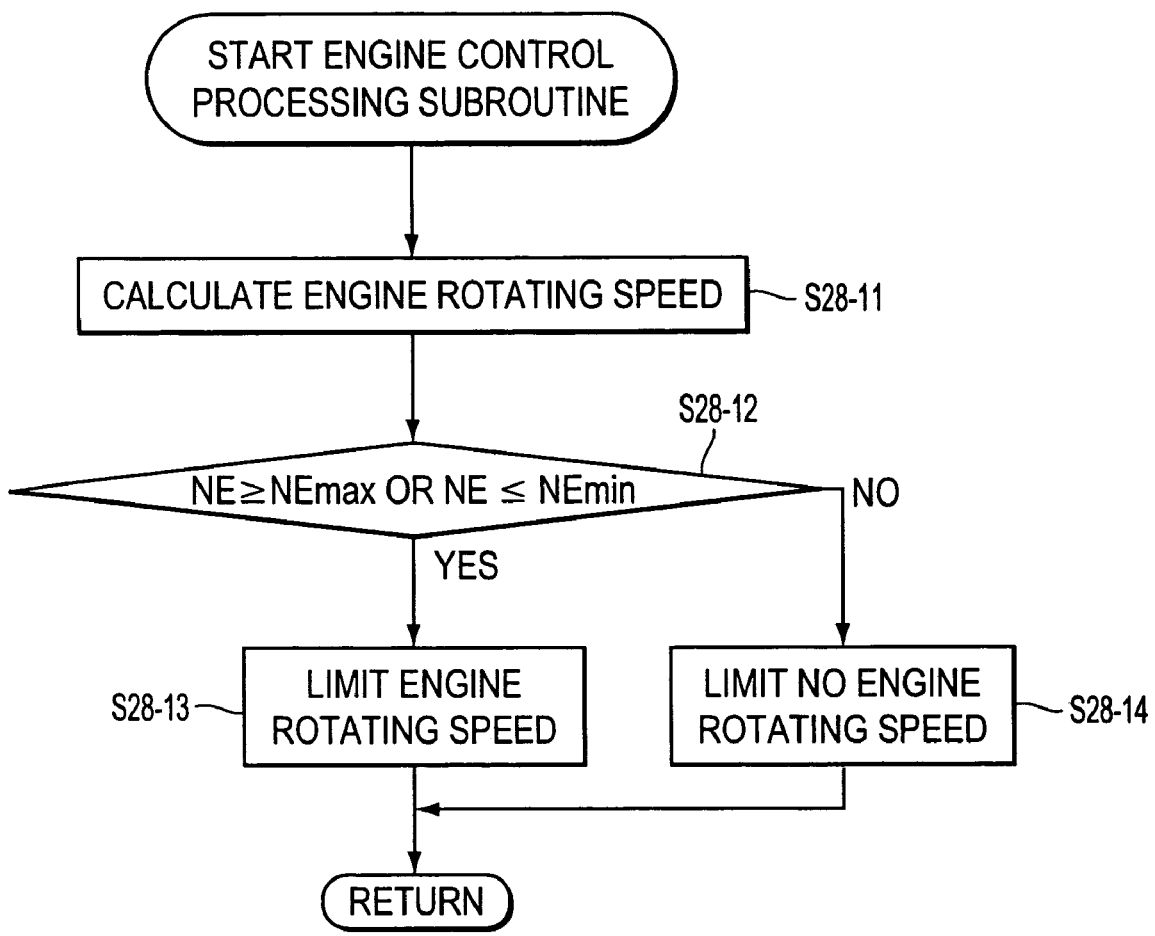
FIG. 17 is a view showing a subroutine of engine control processing in a second exemplary embodiment.
Figure 18:
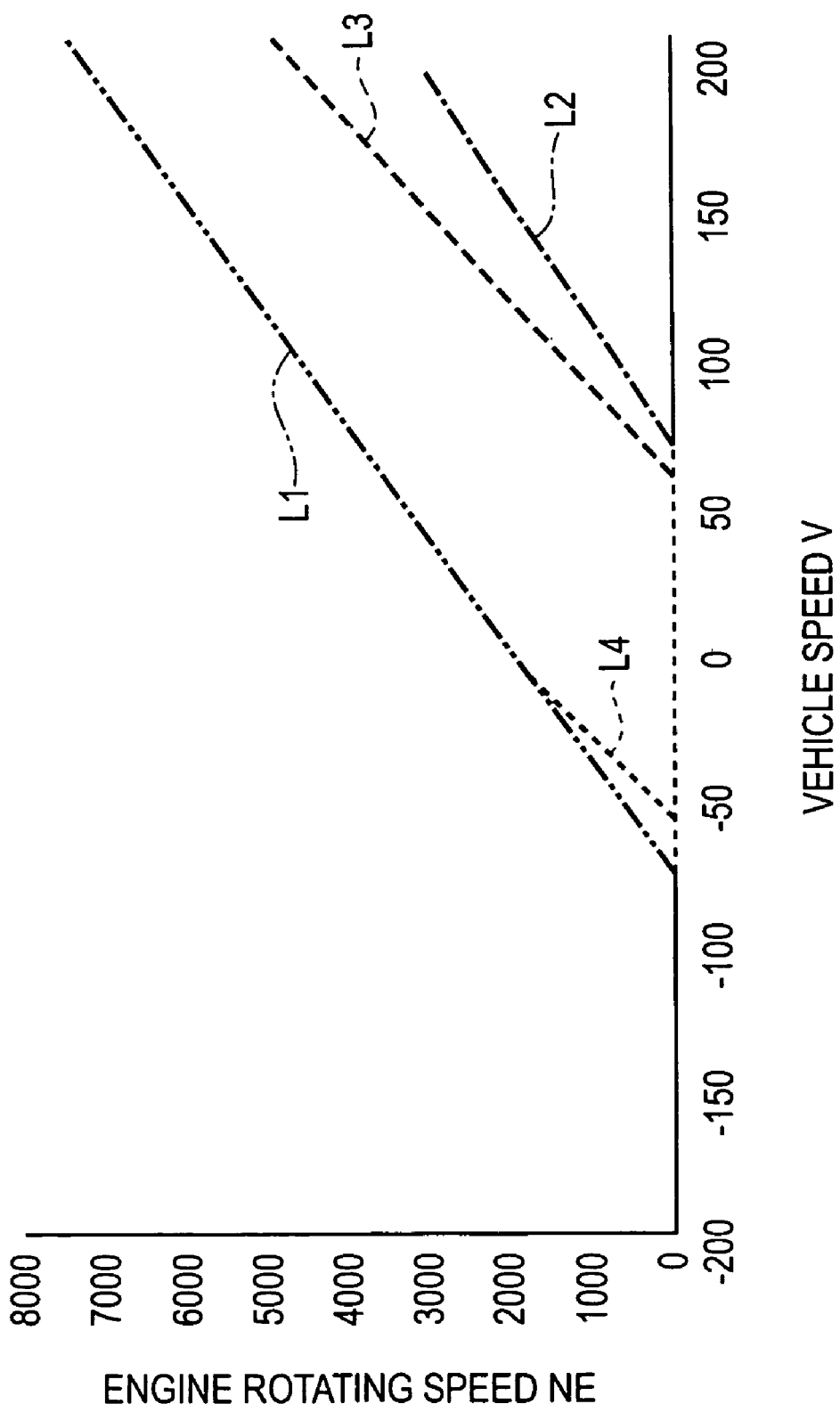
FIG. 18 is a view showing an engine rotating speed map in the second exemplary embodiment.

Therefore, a second exemplary embodiment able to reduce the control scale and raise the processing speed will be explained using FIGS. 17 and 18. In FIG. 18, the axis of abscissa shows the vehicle speed V and the axis of ordinate shows the engine rotating speed NE.

In this exemplary embodiment, the engine control processing means 91 (FIG. 1) of the vehicle controller 51 (FIG. 6) calculates the present engine rotating speed NE (step S28-11) and judges whether the engine rotating speed NE is an upper limit value NEmax or more, or whether the engine rotating speed NE is a lower limit value NEmin or less (step S28-12). When the engine rotating speed NE is the upper limit value NEmax or more, or the engine rotating speed NE is the lower limit value NEmin or less (step S28-12, Yes), the engine control processing means 91 limits the engine rotating speed NE as a first engine rotating index (step S28-13). Therefore, the engine control processing means 91 limits the engine target rotating speed NE* as a second engine rotating index.

Therefore, an engine rotating speed judgment processing means (not individually shown) of the engine control processing means 91 performs engine rotating speed judgment processing and reads the engine rotating speed NE. Further, the engine rotating speed judgment processing means reads the upper limit value NEmax and the lower limit value NEmin of the engine rotating speed NE corresponding to the vehicle speed V with reference to the engine rotating speed map, shown in FIG. 18, and recorded in the recorder of the vehicle controller 51 in advance. Further, the engine rotating speed judgment processing means judges whether the engine rotating speed NE is the upper limit value NEmax or more, or the engine rotating speed NE is the lower limit value NEmin or less.

In FIG. 18, reference numeral L1 designates a line showing the upper limit value NEmax of the engine rotating speed NE. When the engine rotating speed NE becomes the upper limit value NEmax shown by the line L1 or more, the electric generator 16 is excessively rotated in the positive direction and the electric generator rotating speed NG exceeds an upper limit value NGmax. Reference numeral L3 designates a line showing the lower limit value NEmin of the engine rotating speed NE. When the engine rotating speed NE becomes the lower limit value NEmin, shown by the line L3, or less, the pinion P is excessively rotated and the pinion rotating speed NP exceeds an upper limit value NPmax. Reference numeral L2 designates a line showing a lower limit value NGmin of the electric generator rotating speed NG when the electric generator 16 is excessively rotated in the negative direction. Further, reference numeral L4 designates a line showing the upper limit value NEmax of the engine rotating speed NE when the vehicle speed V is set on the negative side and the pinion rotating speed NP is excessively rotated.

In the engine rotating speed map, the upper limit value NEmax of the engine rotating speed NE corresponding to each vehicle speed V is calculated in advance correspondingly to the upper limit value NGmax such that no electric generator rotating speed NG becomes the upper limit value NGmax or more. Further, the lower limit value NEmin of the engine rotating speed NE corresponding to each vehicle speed V is calculated in advance correspondingly to the upper limit value NPmax such that no pinion rotating speed NP becomes the upper limit value NPmax or more. The vehicle speed V, the upper limit value NEmax and the lower limit value NEmin are recorded in the recorder in correspondence to each other.

On the basis of the ring gear rotating speed NR, the upper limit value NPmax set in advance, and the ratio γpr, γpr=Zp/Zr, of the tooth number Zp of the pinion P to the tooth number Zr of the ring gear R, the lower limit value NEmin of the engine rotating speed NE, NEmin=NR−NPmax·γpr, can be calculated.

When the engine rotating speed NE is the upper limit value NEmax or more, or the engine rotating speed NE is the lower limit value NEmin or less, the correction processing means of the engine control processing means 91 limits the engine rotating speed NE and corrects the engine target rotating speed NE*. Namely, when the engine rotating speed NE is the upper limit value NEmax or more, the correction processing means sets the upper limit value NEmax to the engine target rotating speed NE*. In contrast to this, when the engine rotating speed NE is the lower limit value NEmin or less, the correction processing means sets the lower limit value NEmin to the engine target rotating speed NE* (step S28-13).

In contrast to this, when the engine rotating speed NE is lower than the upper limit value NEmax and is higher than the lower limit value NEmin (step S28-12, No), the above engine control processing means 91 does not limit the engine rotating speed NE (step S28-14). Further, the engine target rotating speed NE* is not corrected.

Thus, in this second exemplary embodiment, it is sufficient to read the engine rotating speed NE to perform the correction processing. Accordingly, the control scale can be reduced and the processing speed can be raised.

The invention is not limited to the above exemplary embodiments, but can be variously modified on the basis of the features of the invention without departing from the scope of the invention.

What is claimed is:

1. An electrically operated vehicle drive controller used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, the controller comprising:

control element that limits an engine rotating speed such that a rotating speed of the rotating body becomes lower than an upper limit value on the basis of the rotating speed of the rotating body, wherein the differential rotating unit is a planetary gear unit, and the first differential rotating element is a sun gear, and the second differential rotating element is a ring gear, and the third differential rotating element is a carrier, and the control element controls the operation of the engine on the basis of a rotating speed of a pinion gear rotatably arranged with respect to a support shaft of the carrier.

2. The electrically operated vehicle drive controller according to claim 1, wherein the control element calculates the rotating speed of the rotating body and judges whether the rotating speed of the rotating body is the upper limit value or more, and limits an engine rotating speed such that the rotating speed of the rotating body becomes lower than the upper limit value when the rotating speed of the rotating body is the upper limit value or more.

3. The electrically operated vehicle drive controller according to claim 2, wherein the control element sets the limited engine rotating speed to an engine target rotating speed.

4. The electrically operated vehicle drive controller according to claim 1, wherein the control element calculates the engine rotating speed and judges whether the engine rotating speed is a lower limit value of the engine rotating speed or less set in correspondence to the upper limit value of the rotating speed of the rotating body, and limits the engine rotating speed such that the engine rotating speed becomes higher than the lower limit value when the engine rotating speed is the lower limit value or less.

5. The electrically operated vehicle drive controller according to claim 4, wherein the control element sets the limited engine rotating speed to an engine target rotating speed.

6. The electrically operated vehicle drive controller according to claim 1, wherein the control element calculates the engine rotating speed and judges whether the engine rotating speed is an upper limit value of the engine rotating speed or more set in correspondence to the upper limit value of the rotating speed of the rotating body, and limits the engine rotating speed such that the engine rotating speed becomes lower than the upper limit value when the engine rotating speed is the upper limit value or more.

7. The electrically operated vehicle drive controller according to claim 6, wherein the element sets the limited engine rotating speed to an engine target rotating speed.

8. The electrically operated vehicle drive controller according to claim 1, wherein the control element sets the limited engine rotating speed to an engine target rotating speed.

9. An electrically operated vehicle drive used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements, and meshed with the other two differential rotating elements, the controller comprising:

a rotating speed detecting section that detects rotating speeds of at least two of the electrically operated machine, the engine and the output shaft; and a rotating body rotating speed calculation processor that calculates a rotating speed of the rotating body on the basis of the rotating speeds detected by the rotating speed detecting section and a rotating speed relationship in the differential rotating unit.

10. The electrically operated vehicle drive controller according to claim 9, wherein the electrically operated vehicle drive controller further comprises an engine control processor that controls the engine on the basis of the rotating speed of the rotating body calculated by the rotating body rotating speed calculation processor.

11. An electrically operated vehicle drive control method of an electrically operated vehicle drive unit used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, the method comprising:

limiting an engine rotating speed such that a rotating speed of the rotating body becomes lower than an upper limit value on the basis of the rotating speed of the rotating body, wherein the differential rotating unit is a planetary gear unit, and the first differential rotating element is a sun gear, and the second differential rotating element is a ring gear, and the third differential rotating element is a carrier, and the engine control processing element controls the operation of the engine on the basis of the rotating speed of a pinion gear rotatably arranged with respect to the support shaft of the carrier.

12. The method according to claim 11, further comprising:

calculating the rotating speed of the rotating body; and judging whether the rotating speed of the rotating body is the upper limit value or more, wherein the limiting the engine rotating speed such that the rotating speed of the rotating body becomes lower than the upper limit value occurs when the rotating speed of the rotating body is the upper limit value or more.

13. The method according to claim 12, further comprising setting the limited engine rotating speed to an engine target rotating speed.

14. The method according to claim 11, further comprising:

calculating the engine rotating speed;

judging whether the engine rotating speed is a lower limit value of the engine rotating speed or less set in correspondence to the upper limit value of the rotating speed of the rotating body; and limiting the engine rotating speed such that the engine rotating speed becomes higher than the lower limit value when the engine rotating speed is the lower limit value or less.

15. The method according to claim 14, further comprising setting the limited engine rotating speed to an engine target rotating speed.

16. An electrically operated vehicle drive controller used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, the controller comprising:

a control element that limits engine torque such that a rotating speed of the rotating body becomes lower than an upper limit value on the basis of the rotating speed of the rotating body, wherein the differential rotating unit is a planetary gear unit, and the first differential rotating element is a sun gear, and the second differential rotating element is a ring gear, and the third differential rotating element is a carrier, and the engine control processing element controls the operation of the engine on the basis of the rotating speed of a pinion gear rotatably arranged with respect to the support shaft of the carrier.

17. The electrically operated vehicle drive controller according to claim 16, wherein the control element calculates the rotating speed of the rotating body and judges whether the rotating speed of the rotating body is the upper limit value or more, and limits engine torque such that the rotating speed of the rotating body becomes lower than the upper limit value when the rotating speed of the rotating body is the upper limit value or more.

18. The electrically operated vehicle drive controller according to claim 17, wherein the control element sets a limited engine rotating speed to an engine target rotating speed.

19. An electrically operated vehicle drive control method of an electrically operated vehicle drive unit used with an electrically operated machine, an output shaft differentially rotatably connected to an engine and the electrically operated machine, and a differential rotating unit having a first differential rotating element connected to the electrically operated machine, a second differential rotating element connected to the output shaft, a third differential rotating element connected to the engine, and a rotating body rotatably arranged on a support shaft in one of the first to third differential rotating elements and meshed with the other two differential rotating elements, the method comprising:

limiting engine torque such that a rotating speed of the rotating body becomes lower than an upper limit value on the basis of a rotating speed of the rotating body, wherein the differential rotating unit is a planetary gear unit, and the first differential rotating element is a sun gear, and the second differential rotating element is a ring gear, and the third differential rotating element is a carrier, and the engine control processing element controls the operation of the engine on the basis of the rotating speed of a pinion gear rotatably arranged with respect to the support shaft of the carrier.

20. The method according to claim 19, further comprising:

calculating the rotating speed of the rotating body; and judging whether the rotating speed of the rotating body is an upper limit value or more, wherein the limiting engine torque such that the rotating speed of the rotating body becomes lower than the upper limit value occurs when the rotating speed of the rotating body is the upper limit value or more.

21. The method according to claim 20, further comprising setting the limited engine torque to an engine target torque.

* * * * *